Dec. 4, 1962
HIROSHI FUKUBA
3,066,339
DUST-CLEANER
Filed April 7, 1960
6 Sheets-Sheet 1
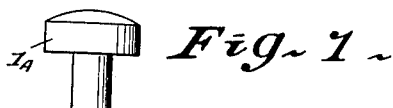
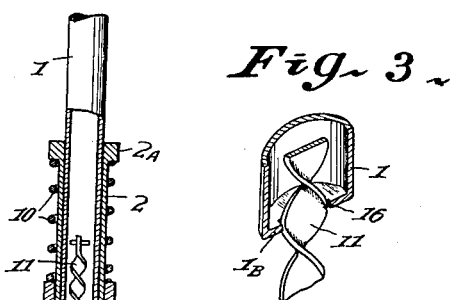
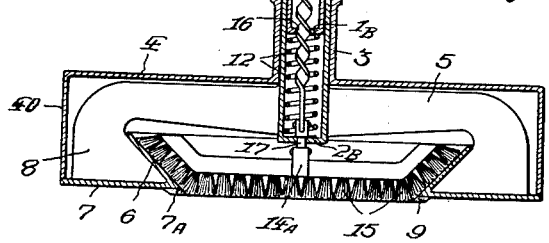
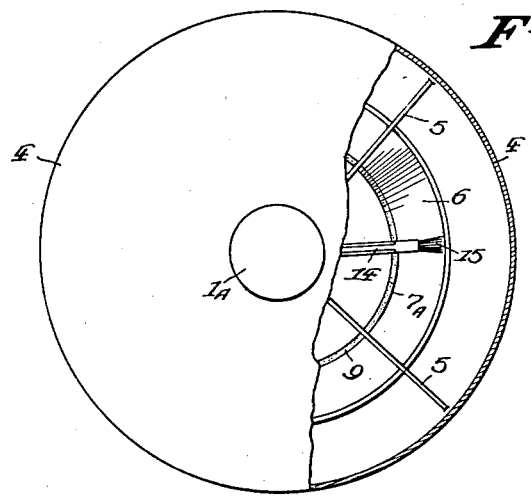
INVENTOR
HIROSHI FUKUBA
BY 
ATTORNEY Dec. 4, 1962
HIROSHI FUKUBA
3,066,339
DUST-CLEANER
Filed April 7, 1960
6 Sheets-Sheet 2
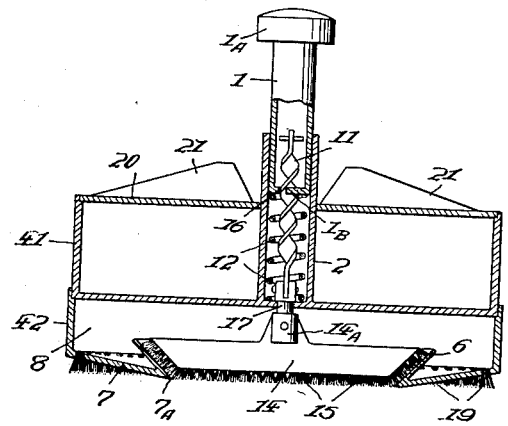
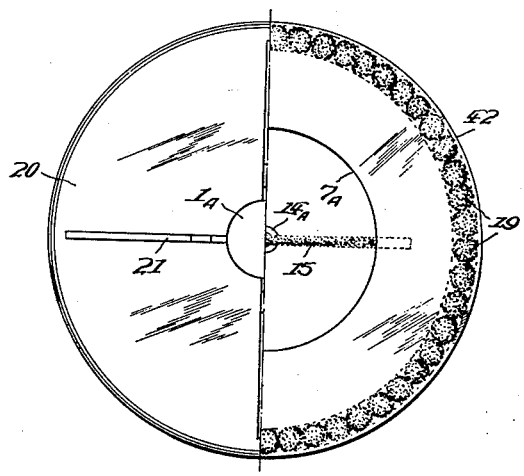
INVENTOR
HIROSHI FUKUBA
BY
ATTORNEY Dec. 4, 1962 HIROSHI FUKUBA 3,066,339
DUST-CLEANER
Filed April 7, 1960 6 Sheets-Sheet 3

INVENTOR
HIROSHI FUKUBA
BY
ATTORNEY

Dec. 4, 1962

HIROSHI FUKUBA
DUST-CLEANER 3,066,339

Filed April 7, 1960

INVENTOR
HIROSHI FUKUBA
BY
ATTORNEY

Dec. 4, 1962  HIROSHI FUKUBA  3,066,339
DUST-CLEANER

Filed April 7, 1960

INVENTOR
HIROSHI FUKUBA
BY
ATTORNEY

United States Patent Office 3,066,339
Patented Dec. 4, 1962

3,066,339
DUST-CLEANER
Hiroshi Fukuba, 320–82, Shinden, Mukaikogane Nagareyama-machi, Higashikatsushika-gun, Chiba-ken, Japan
Filed Apr. 7, 1960, Ser. No. 20,580
Claims priority, application Japan May 26, 1959
3 Claims. (Cl. 15—49)

This invention relates to a cleaner which is so constructed as to push dust on the floor and the like into a dust chamber by the centrifugal force due to the rotation of a picking-up blade.

The cleaner of this invention consists of a diametrical blade which rubbingly rotates on the floor to be cleaned, a slope formed by an inverse conical or the like curved surface provided in contact with the periphery of the rotating area of said blade and a dust chamber which communicates with said slope and is characterized in that dust on the floor is swept with the lower edge of the blade and led into the dust chamber along said slope.

An object of this invention is to effectively separate dust from the floor surface by a great amount of brushing actions of a blade effected by the horizontal rotation of the blade while rubbing the floor against the confined floor area surrounded by a circumferential dust chamber.

Another object is to easily accommodate the particles of dust into the dust chamber by the centrifugal force due to the rotation of the blade liberated on said sweptup particles of dust thereby the dust rises glidingly along the slope of the peripheral wall.

The accompanying drawings show eight embodiments of this invention:

FIG. 1 is a vertical cross-sectional view of an embodiment of this invention;

FIG. 2 is a plan view of a case of the cleaner partially cut away;

FIG. 3 is an enlarged perspective view of the blade shaft showing the rotation mechanism;

FIG. 4 and FIG. 5 show a modification of this invention; FIG. 4 is a vertical section of the modification and FIG. 5 shows in its left half a plan view and in its right half a plan view from the bottom;

Figure 6:
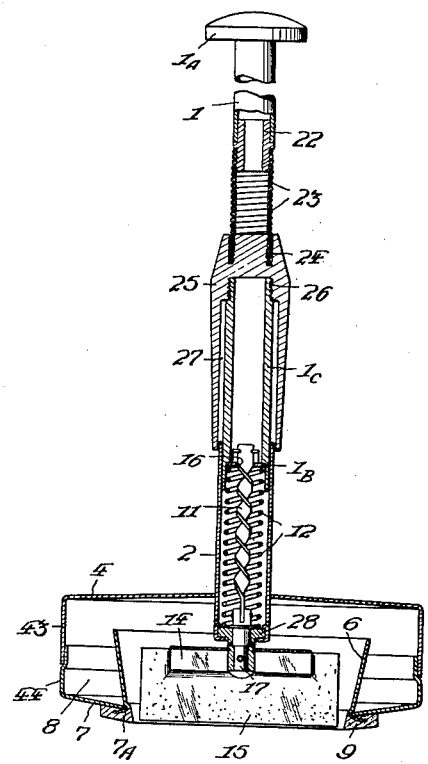
Figure 8:
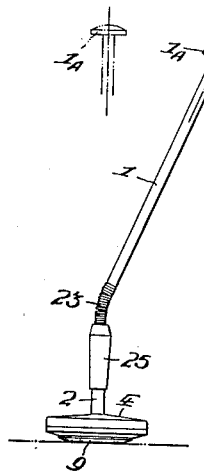
Figure 7:
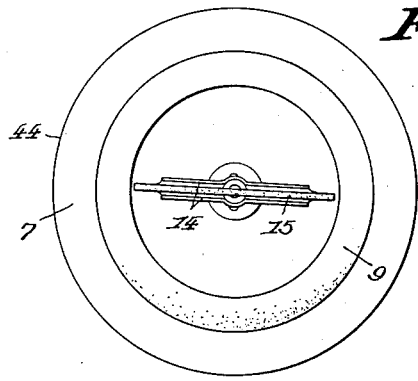
Figure 9:
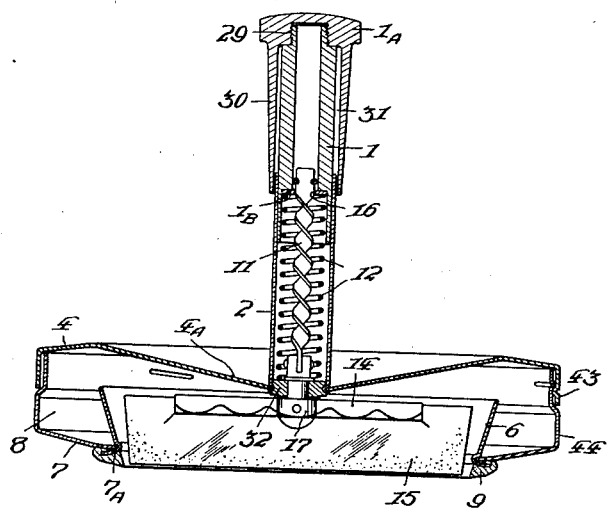
Figure 10:
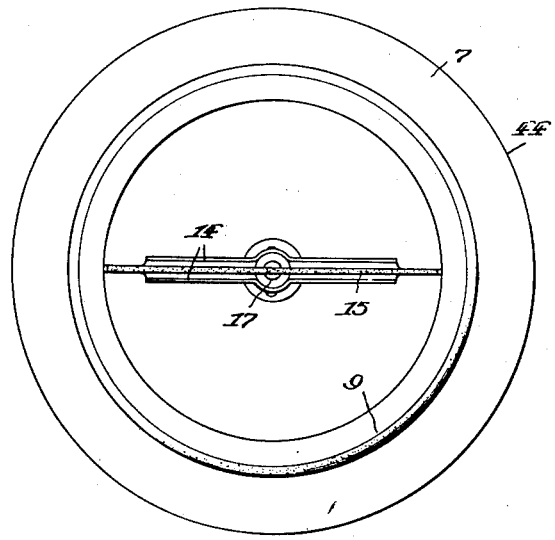
Figure 11:
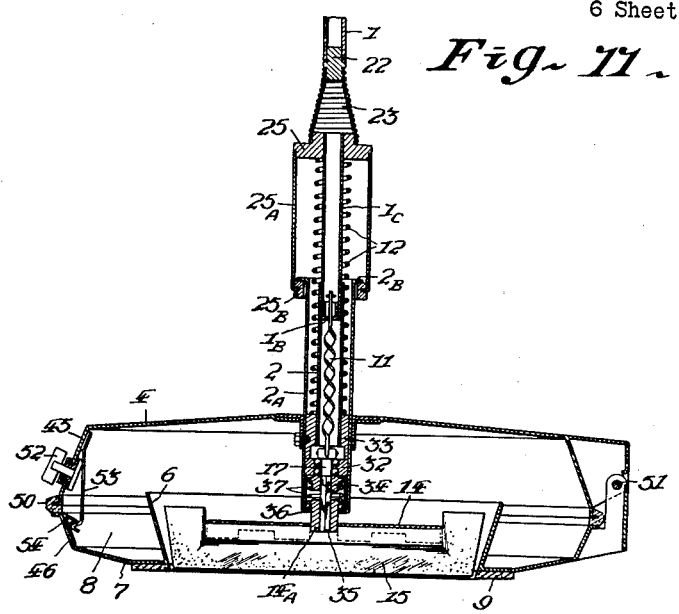
Figure 12:
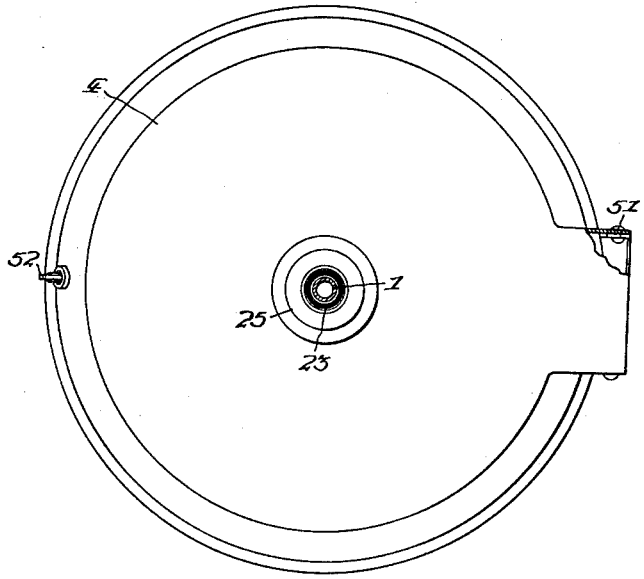
Figure 13:
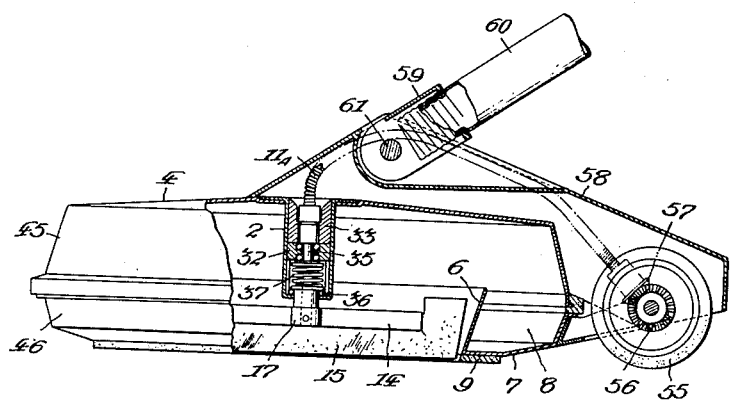
Figure 14:
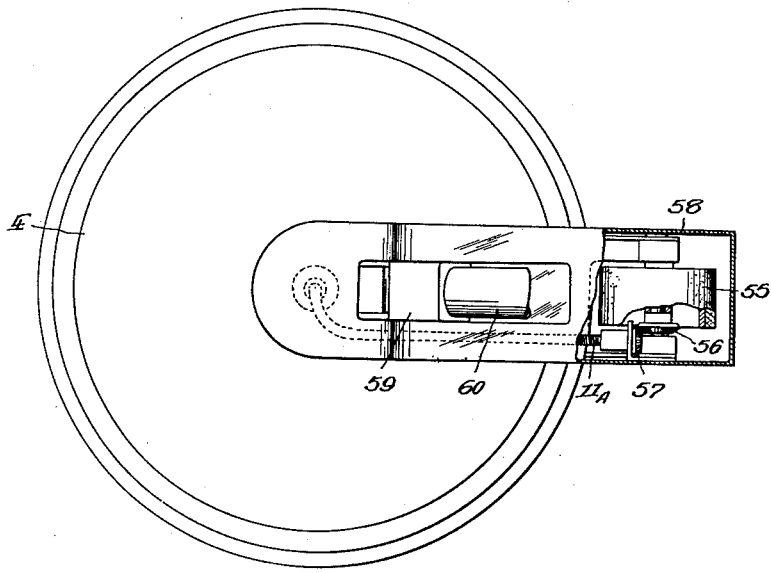

FIG. 6 to FIG. 8 show another modified type of this invention; FIG. 6 is a vertical section of the modification excluding a part of the handle; FIG. 7 is a plan view from the bottom; FIG. 8 is a side elevation of the entire cleaner;

FIG. 9 and FIG. 10 are still another modification of this invention and respectively shows a vertical section and a plan view seen from the bottom;

FIG. 11 and FIG. 12 are still another modification showing a vertical section and a plan view respectively;

FIG. 13 and FIG. 14 show a cleaner embodying this invention which is provided with a mechanism wherein the blade shaft is revolved by a friction roller which rotates when the case is moved on the floor surface; FIG. 13 is a vertical section; FIG. 14 is a plan view excluding a part of the case.

Similar numerals refer to similar parts throughout all the figures.

In FIG. 1, the case of this cleaner consists of a cover 4 having a cylindrical wall 40 and a bottom plate 7 which fits said cover and provided in the bottom plate 7 with a circular opening 7A, an inner wall 6 having inverse conical surface in connection with the periphery of said opening and several number of radial ribs 5. The lower end of the periphery of the opening 7A is fixed with a cushion material e.g. a piece of rubber for the contact with the floor surface to be cleaned. The space 8 formed by the cylindrical wall 40 of the above cover 4, the bottom plate 7 and the back surface of the wall 6 of the above conical surface constitutes a chamber to store dust. A tube 2 which is fixed with the above ribs 5 is fitted into a tube 3 which is fixed with the center of the cover 4 as one body, and the lower end of the peripheral wall 40 of the cover 4 is pressed against the bottom plate 7 with a compression spring 10 which is provided between the upper end of the fixed tube 3 and a flange 2A at the end of the guide tube 2 through the tube 3. The lower end of the guide tube 2 is pivoted with a vertical rotary shaft 17 which is fixed with a boss 14A of a diametrical blade 14. The lower edge of the blade 14 is provided with a brush or a piece of felt or the like material to rub the floor and pick up the dust on the floor. A thread screw member 11 having comparatively large pitch which is disposed at the upper end of the shaft 17 engages with a slot 16 which is provided at the lower end 1B of an operating tubular shaft 1 attached with a knob 1A at the upper end and takes the shape to correspond with the section of the above screw member. A compression spring 12 provided between the lower end 1B of the operating shaft 1 and the bottom 2B of the guide tube 2 is useful to make the shaft 1, which is pushed down along the guide tube 2 in order to actuate the blade 14, return upward automatically.

In using the cleaner of the above structure, the case 4 is placed on the floor to be cleaned and the operating shaft 1 is pressed down along the inner surface of the guide tube 2 with a knob 1A, then by the slot 16 at the lower end of the operating shaft the screw member 11 which engages with the slot is rotated around the axis of the shaft. In consequence, the shaft 17 fixed with the screw member and the blade attached with a brush 15 are rotated horizontally with the lower end 2B of the guide tube 2 as its center and the brush 15 so provided as to closely contact with the floor surface rotates together with the blade 14, thereby the dust of the floor is moved and pushed up by the centrifugal force along the conical surface of the wall 6 which is in the form of slope appropriate for the dust to slide up into the space in the pepriphery of the wall within the case, that is a dust chamber 8 within the cover 4, an air space 8 is formed extending above the rotating area of the blade 14 down to the outside of the slope 6, whereby the dust which has been picked up by the brush 15 and carried into the space 8 along the slope 6 together with the air is freed from the air suspension with its own weight in said space and falls and collects on the bottom plate 7. By moving the case of the cleaner to the desired place of the floor and repeating the above operation, cleaning can be completed.

A cleaner shown in FIG. 4 and FIG. 5 which is a modification of this invention is for the use of picking up crumbs of bread and the like on a dining table and the like. Case 41 having a bottom is provided with another case 42 which engages with the lower end of the case 41. The bottom plate 7 of the case 42 is conical to keep proper distance from the floor surface and provided with a circular edge 7A of a round opening in the center as in the above embodiment shown in FIG. 1 to FIG. 3, and a wall 6 having inverse conical surface being connected with said circular edge 7A. The upper part of the case 41 is open so as to be provided with a lid 20 having a knob 21. The bottom of the case 41 is provided with a guide tube 2 vertically and as one body, said tube 2 penetrating the center of the said lid 20 and being engaged with an operating tubular shaft 1. The constructions of a slot 16 at the lower end 1B of the said tubular shaft, a screw member 11 engaged with said slot, a rotary shaft 17 at the lower end of the screw and a blade 14 having a brush 15 furnished with a boss 14A and the action of the brush 15 towards the table surface to be cleaned and the slope of the wall 6 due to the inverse conical surface are the same as in the embodiment of FIG. 1 to FIG. 3 and thereby the dust such as crumbs of bread and the like picked up from the table is pushed into a dust chamber composed of space 8. A brush 19 installed at the under surface of the bottom plate 7 of the case 42 is useful for picking up dust on the table manually by displacing the case on the table with the knob 1A.

Also, case 41 which can be opened by taking the lid 20 with the knob 21 is useful as a container for butter and the like.

A cleaner shown in FIG. 6 to FIG. 8 which is another modification of this invention is constructed so that the part of a handle of an operating shaft and the part of a guide tube of said shaft to be fixed to the case are connected with a flexible shaft so that the part of the case to be contacted with the floor surface may be constantly maintained in close contact with the floor surface to be cleaned even in case the operating shaft is inclined.

A hollow member 1C which is fitted into the guide tube 2 fixed to the center of the upper part 43 of the case 4 and slides up and down along said tube is provided with an outer sleeve 25 with a screw part in the upper end of said hollow member, and the outer sleeve 25 is connected with an operating shaft 1 having a knob 1A by way of a flexible shaft 23 which is fitted into a groove 24. Between the internal bore of the said sleeve 25 and the hollow member 1C, clearance 27 is formed to admit the entry of the said guide tube 2 at the time the shaft 1 for actuating the cleaner is pushed down. The relative construction of the slot 16 of an end member 1B provided at the lower end of the said hollow member 1C, a screw member 11, a shaft 17 at the lower end of said screw member, a blade 14 and a brush member 15, and a compression spring 12 within the guide tube 2 is the same as in the above two examples. Similarly as in the above first embodiment, the center opening of the bottom plate 7 of the lower part 44 of the case 4 is connected with a wall 6 having an inverse conical surface and at the connection edge 7A a cushioning material 9 is secured. 28 is a bearing member for the upper part of the shaft 17. The upper part 43 and the lower part 44 of the case may be taken off for the discharge of the dust stored in the dust chamber 8.

In the modification of FIG. 9 and FIG. 10, a sleeve 30 which forms one body with an operating shaft 1 and a knob 1A is secured by means of a screw 29 at the upper part of a tubular shaft 1 and the clearance 31 between the internal bore of the said sleeve 30 and the shaft 1 is for the entry of the upper part of the guide tube 2. A bearing 32 for the shaft 17 of the blade 15 is provided in the inner part at the lower end of the guide tube 2, and other structures are the same as in the above modification shown by FIG. 7 and FIG. 8.

In the modification of FIG. 11 and FIG. 12, a guide tube 2 is secured by means of a sleeve 33 at its lower end with an outer tube 2A which is fixed to the upper lid of the case 4. A ring 25B which is slidable up and down along the outer periphery of the outer tube 2A is provided at its upper part with a disc 25 by means of a tube 25A and the upper part of an internal tube 1C which is longitudinally slidable into the said guide tube 2 is fixed with the center of the disc 25. A flexible coil 23 is fixed with the upper convex part of the disc 25 and the upper end of the flexible coil is connected with the lower end of an opearting shaft 1 by means of a fixture 22. The arrangement wherein a member 1B at the bottom end of the internal tube 1C engages with a screw member 11 which is rotated around the shaft according to the descent of the internal tube is similar to those other embodiments described in the above. However, by the pressing down of the operating shaft 1 the internal tube 1C proceeds downwards against a compression spring 12 by means of a flexible coil 23 and a disc 25 and returns upward by the spring pressed at the time. Its return movement is limited by a flange 2B at the upper end of the outer tube 2A. A spindle 17 connected with the lower end of the screw member 11 is journaled in ball bearings 32 fixed to the inner side of the outer tube 2A and its lower part 35 having a square section is fitted into a boss 14A of the blade 14. The enlarged part of the upper end of the boss 14A is supported by ball bearings 36 in the outer tube 2A and imparted with a tendency to be pressed down by a compression spring 37 which is arranged between a piece fixed to the said spindle and the boss 14A. Accordingly, the lower edge of a brush member 15 secured to the blade 14 normally projects by proper length from the bottom plate 7 of the case and the cushion member 9, thereby the blade 14 and the brush 15 keep close contact with the floor surface while rotating to the effect of a good cleaning action.

The case 4 shown in these figures is composed of an upper lid having a peripheral wall 45 and the lower part composed of a peripheral wall 46, a bottom plate and an inverse conical wall 6, and the upper lid is pivotally attached to the lower part by means of a pin 51, openable with a knob 52, and engages with elastic latches 53 and 54 in order to maintain the closed position. A packing 50 secured at the lower edge of the peripheral wall 45 of the upper lid is useful for maintaining the air-tightness. That the space formed by the peripheral wall 46 of the lower part, the bottom plate 7 and the inverse conical wall 6 constitutes a dust chamber and a slope of a conical surface 6 has the effect for the dust to slide in, is similar to other modifications described in the above.

In the modification of FIG. 13 and FIG. 14, the structure is similar to that of the modification shown in the above FIG. 11 and FIG. 12 in that a case 4 comprises an upper lid having a peripheral wall 45, a peripheral wall 46, a bottom plate 7 and the lower part consisting of an inverse conical wall 6, and provided with a blade 14 rotatable with a boss 17 and a brush 15 fixed to said blade 14. The rotary mechanism of the boss 17 is as follows:

A spindle 35 to rotate the boss 17 is journaled in ball bearings 32 supported in a guide tube 2 fixed to the case 4, and rotatably connected with a friction roller 55 by means of bevel gears 56 and 57 and a flexible shaft 11A. The said friction roller 55 may be rotated by the friction of the roller against the floor surface at the time of displacing the case 4 on the floor to be cleaned with an operating handle 60. The structure that a compression coil spring 37 around the spindle 35 presses down the projected end of a boss 17 against ball bearings 36 so that a brush member 15 may contact properly with the floor surface, is similar to the above embodiments shown in FIG. 11 and FIG. 12.

What is claimed is:

1. A dust cleaner comprising, in combination, a cover member including a bottom plate, a diametrical blade rotatably mounted within said cover member and provided with a brush which rubbingly rotates on the surface to be cleaned, means to rotate said blade, an upwardly and outwardly sloping inner wall disposed adjacent to and surrounding the area of rotation of said blade for guiding dust picked up by said brush, said inner wall being fixed in a stationary position with respect to the rotation of said blade, an air space within said cover receiving said dust, said air space extending from above the area of rotation of said blade down to the bottom plate positioned adjacent to and outside of said inner wall, whereby the dust which has been picked up by said brush separates from a suspension of air within said air space and is collected on said bottom plate.

2. A dust cleaner in accordance with claim 1 wherein the means to rotate said blade includes a roller operatively connected to said blade, said roller being rotated by the friction of said roller against the floor surface.

3. A dust cleaner comprising, in combination, a cover member including a bottom plate, a diametrical blade rotatably mounted within said cover member and provided with a brush which rubbingly rotates on the surface to be cleaned, a tubular operating shaft having a lower end with a slot positioned therein, a rotatable screw member operatively connected to said blade and engageable with said slot, means to reciprocate said screw member in said slot whereby said blade is rotated, an inclined surface disposed adjacent to and surrounding the area of rotation of said blade for guiding dust picked up by said brush, an air space within said cover receiving said dust, said air space extending from above the area of rotation of said blade down to said bottom plate positioned adjacent to and outside of said inclined surface, whereby the dust which has been picked up by said brush separates from a suspension of air within said air space and is collected on said bottom plate.

References Cited in the file of this patent

UNITED STATES PATENTS

| | | |
|---|---|---|
| 778,427 | Noll | Dec. 27, 1904 |
| 2,415,372 | Salt et al. | Feb. 4, 1947 |
| 2,893,037 | Strong | July 7, 1959 |

FOREIGN PATENTS

| | | |
|---|---|---|
| 235,684 | Great Britain | June 25, 1925 |